Nov. 20, 1934.　　　　J. P. DURNING　　　　1,981,497
DUST REMOVER FOR SCRAP BUNCH CIGAR MACHINES
Filed April 14, 1933
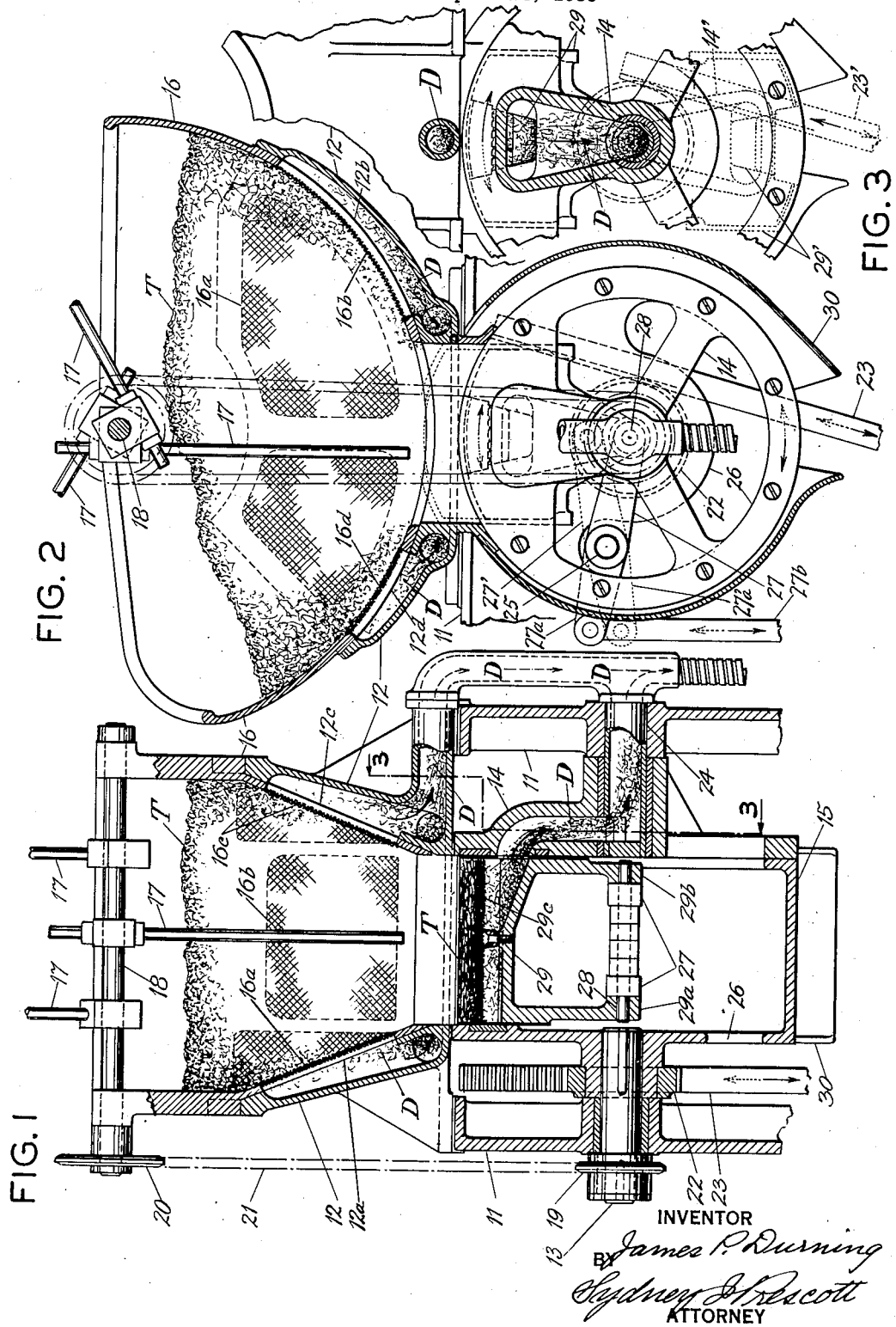
INVENTOR
James P. Durning
BY Sydney Prescott
ATTORNEY Patented Nov. 20, 1934

1,981,497

UNITED STATES PATENT OFFICE 1,981,497

DUST REMOVER FOR SCRAP BUNCH CIGAR MACHINES

James P. Durning, St. Albans, N. Y., assignor to International Cigar Machinery Company, a corporation of New Jersey Application April 14, 1933, Serial No. 666,206

16 Claims. (Cl. 131—39)

This invention relates to a novel attachment for scrap bunch cigar machines and the like, wherein it is desirable to remove dust or small particles from the material before it is transferred into subsequent operating units of the machine. One of the main objects of the invention, therefore, is the production of a novel attachment for removing dust.

The invention, as disclosed herein, has particular application to scrap bunch cigar machines such as described in the copending application S. N. 629,966, filed August 22, 1932, and the accompanying drawing, therefore illustrates it in combination with the above mentioned machine; but it will be understood that the invention is not limited to scrap bunch machines.

The scrap tobacco, or other material, is delivered into a magazine or hopper which fits snugly into a saddle or base. The latter is essentially an air-jacket, the air-ducts of which communicate with openings in the bottom portion of the hopper. The openings in the hopper are provided with perforated plates or, as shown in the drawing, with wire mesh of suitable gauge.

A source of suction is connected to the air-jacket whereby, as the material is being intermittently agitated in the hopper, dust and small particles of the material are exhausted. Accordingly, a further object of the invention is the provision of a hopper having a suction cleaning device.

Below the base of the hopper is located an oscillating transfer drum with a reciprocating pan, which receives a charge of tobacco from the hopper and transfers it to a measuring chamber below. However, the pan in the present invention is provided with a false bottom, either perforated or covered with wire-mesh of suitable gauge. The bottom of the pan is connected with the suction device through an air duct in the spider of the transfer drum, the bottom of the pan adjacent the air-duct being sloped to register therewith. The hub of the spider is loosely mounted on a tube also connected to the source of suction and provided with a circumferential slot registering with the air-duct in the spider. It is thus possible to so arrange the slope of the bottom of the pan that the air-duct will be entirely cut off or left fully open at the time the pan is in charging position in the hopper. However, if the air-duct has been cut off while the pan is being charged, it will gradually open up as the pan recedes into the transfer drum and will remain fully open until the drum has completed about three-quarters of its oscillation, whereupon its outlet will gradually move out of registry with the slot in the tube and cut off the connection to the source of suction as the pan approaches the position for dumping the charge.

The connections to the source of suction can be so arranged that either the hopper or the pan can be connected independently or they may be both operating at the same time.

In the accompanying drawing which forms a part of this specification, and in which like characters of reference indicate the same or like parts:

Fig. 1 is a sectional end elevation showing the dust remover as applied to a scrap bunch cigar machine of the type disclosed in the copending application referred to above;

Fig. 2 is a sectional side elevation of same; and

Fig. 3 is a detail sectional view on line 3—3 of Fig. 1.

In carrying the invention into effect there is provided a hopper adapted to contain a mass of scrap tobacco, means for agitating the tobacco in said hopper, and suction means for exhausting the dust and loose particles stirred up from the tobacco in said hopper by said agitating means. In the best forms of construction contemplated there is also provided mechanism for removing a charge of tobacco from said hopper, and suction means for exhausting dust and loose particles from said mechanism. These various means and parts may be widely varied in construction for the specific device selected to illustrate the invention is but one of many possible concrete embodiments of the same. The invention, therefore, is not to be restricted to the specific construction shown and described.

Referring to Figs. 1 and 2, the side frames 11 support the saddle or base 12 of the hopper 16. The side frames 11 are also provided with bearings for shaft 13 on which is mounted the transfer drum 15.

The scrap tobacco T in hopper 16 is kept in loose condition by agitating rods 17 mounted on shaft 18, supported by bearings in the hopper, and intermittently driven from shaft 13 by means of sprockets 19 and 20 and chain 21, the sprocket 19 being connected to shaft 13 by a suitable device, such as a ball clutch or a pawl and ratchet, so as to turn in one direction only. The shaft 13 is alternately turned one-half revolution forward and back by means of a gear 22 attached to transfer drum 15 and engaging with a rack 23 attached to a cam lever operated from a cam mounted on the main shaft, not shown, which controls all motions imparted to the various units in the machine, thus establishing perfect synchronism.

A shaft 25, one end of which is journaled in side frame 11, extends through a semi-circular slot 26 in drum 15, and carries, within the drum a forked lever 27 supporting shaft 28. On shaft 28 are mounted the side arms 29a and 29b of pan 29, which is slidable in an opening in drum 15. The shaft 28 also has a crank 27a fixed thereon outside of drum 15, and connected by rod 27b to a cam lever operated from a cam mounted on the main shaft (not shown).

When the drum 15 carries the pan into position underneath the mouth of the hopper 16, lever 27, by means of motion imparted from the cam on the main shaft through a cam lever and rod 27b and crank 27a, raises the pan 29 into the hopper to fill it with a charge of tobacco, and then lowers it back into the drum 15. After the pan is completely housed in the drum, rack 23, by means of gear 22, turns the drum through one-half of a revolution so that the pan 29 is now in reversed position 29' and opposite the lower opening in the drum-housing 30, ready to dump the charge.

The bottom portion of hopper 16 is provided with openings 16a, 16b, 16c, and 16d as shown in Figs. 1 and 2. These openings are covered with perforated plates or wire mesh of suitable gauge, and register with the ducts 12a, 12b, 12c and 12d formed in the saddle or base 13, and intercommunicating with each other to provide a single outlet. A suction device of conventional construction, not shown, is connected to said outlet through a suction pipe to carry off dust D and small particles which have been stirred up in the hopper by agitating rods 17.

After the pan 29 has received its charge and starts to recede into the transfer drum, its sloping bottom portion, underneath the perforated false bottom 29c, which supports the charge, gradually comes into full register with the air-duct in transfer drum spider 14, and remains in this position during the oscillation of the transfer drum. The air-duct in spider 14 is connected to a suction pipe leading to the suction device through a hollow stationary tube 24 having a circumferential slot communicating with said air-duct, whereby, as transfer drum 15 and spider 14 turn, the circumferential slot in tube 24 is gradually being shut off before the pan carries the charge of tobacco into discharging position.

The charge in the pan is thus subjected to the action of the suction device during the greater part of the oscillation of the transfer drum, and further removal of dust D and small particles will result. By placing valves in the suction pipe the hopper or the pan can be cut off as desired.

What is claimed is:

1. The combination with a hopper adapted to contain a mass of scrap tobacco, of means for agitating the tobacco in said hopper, and suction means for exhausting the dust and small particles stirred up from the tobacco in said hopper by said agitating means, said suction means including a saddle into which said hopper is fitted, said saddle having a plurality of air ducts intercommunicating with each other to provide a single outlet, and said hopper having openings registering with the entrances to said ducts and provided with reticulated screens covering said openings.

2. The combination with a hopper adapted to contain a mass of scrap tobacco, of mechanism for removing a charge of tobacco from said hopper, and suction means for exhausting dust and loose particles from said mechanism while it is removing a charge of tobacco from said hopper.

3. The combination with a hopper adapted to contain a mass of scrap tobacco, of mechanism for removing a charge of tobacco from said hopper, and suction means for exhausting dust and loose particles from said mechanism while it is removing a charge of tobacco from said hopper, said means also operating to exhaust dust and loose particles from the mass of tobacco in said hopper.

4. The combination with a hopper adapted to contain a mass of scrap tobacco, of mechanism for removing a charge of tobacco from said hopper, and suction means for exhausting dust and loose particles from said mechanism while it is removing a charge of tobacco from said hopper, said mechanism including a pan having a reticulated false bottom, and a device for inserting the pan into said hopper to receive a charge of tobacco on said false bottom and then retracting the pan from the hopper with the charge on the false bottom, and said suction means communicating with the interior of said pan below the false bottom to suck the dust and loose particles through the false bottom.

5. The combination with a hopper adapted to contain a mass of scrap tobacco, of an oscillatable transfer drum underlying said hopper, mechanism for intermittently oscillating said drum, a pan slidably mounted in said drum, means operating to project said pan up through the outlet of said hopper to fill it with a charge of tobacco and then retract it into said drum with the charge, and suction means for removing dust and loose particles from the mass of tobacco in said hopper and the charge of tobacco in said pan, said suction means also operating to retain the charge in said pocket during the oscillation of said drum.

6. The combination with a hopper adapted to contain a mass of scrap tobacco, of an oscillatable transfer drum underlying said hopper, mechanism for intermittently oscillating said drum, a pan slidably mounted in said drum, means operating to project said pan up through the outlet of said hopper to fill it with a charge of tobacco and then retract it into said drum with the charge, and suction means for removing dust and loose particles from the mass of tobacco in said hopper and the charge of tobacco in said pan, said suction means also operating to retain the charge in said pocket during the oscillation of said drum, and including a saddle into which said hopper is fitted, said saddle having a plurality of air-ducts intercommunicating with each other to provide a single outlet, and said hopper having openings registering with the entrances to said ducts and provided with reticulated screens covering said openings.

7. The combination with a hopper adapted to contain a mass of scrap tobacco, of an oscillatable transfer drum underlying said hopper, a pan slidably mounted in said drum and provided with a reticulated false bottom adapted to support a charge of tobacco, means for projecting said pan up through the outlet of said hopper to fill it with a charge of tobacco and then retracting it into said drum with the charge, and suction means for removing dust and loose particles from the mass of tobacco in said hopper and the charge of tobacco in said pan, said drum having a spider on one end thereof, and said means including an air-duct in said spider communicating with the interior of said pan, and a tube on which said spider is loosely mounted, the air-duct in said spider communicating with the interior of said tube.

8. The combination with an oscillatable transfer drum, of a pan slidably mounted in said drum and adapted to receive a charge of tobacco, means for projecting said pan out from said drum to receive a charge of tobacco and then retracting it into the drum with the charge, and suction means for removing dust and loose particles from the charge of tobacco in the pan while the latter is retracting into the drum.

9. The combination with an oscillatable transfer drum, of a pan slidably mounted in said drum and provided with a reticulated false bottom adapted to support a charge of tobacco, means for projecting said pan out from said drum to receive a charge of tobacco on the false bottom, and then retracting it into the drum with the charge, and suction means communicating with the interior of the pan below its false bottom to suck dust and loose particles through the false bottom.

10. The combination with an oscillatable transfer drum, of a pan slidably mounted in said drum and provided with a reticulated false bottom adapted to support a charge of tobacco, means for projecting said pan out from said drum to receive a charge of tobacco on the false bottom, and then retracting it into the drum with the charge, and suction means communicating with the interior of the pan below its false bottom to suck dust and loose particles through the false bottom, said drum having a spider on one end thereof, and said means including a tube on which said spider is loosely mounted, and an air-duct in said spider communicating with the interior of said pan and tube.

11. The combination with an oscillatable transfer drum, of a pan slidably mounted in said drum and provided with a reticulated false bottom adapted to support a charge of tobacco, means for projecting said pan out from said drum to receive a charge of tobacco on the false bottom, and then retracting it into the drum with the charge, and suction means communicating with the interior of the pan below its false bottom to suck dust and loose particles through the false bottom, said drum having a spider on one end thereof, and said means including a tube on which said spider is loosely mounted, and an air-duct in said spider communicating with the interior of said pan and tube, said pan being arranged to close the entrance to said air-duct when it is projected out from the transfer drum.

12. The combination with an oscillatable transfer drum, of a pan slidably mounted in said drum and provided with a reticulated false bottom adapted to support a charge of tobacco, means for projecting said pan out from said drum to receive a charge of tobacco on the false bottom, and then retracting it into the drum with the charge, and suction means communicating with the interior of the pan below its false bottom to suck dust and loose particles through the false bottom, said drum having a spider on one end thereof, and said means including a tube on which said spider is loosely mounted, and an air-duct in said spider communicating with the interior of said pan and tube, said air-duct being arranged to communicate with the interior of said pan when the latter is projected out from said drum.

13. The combination with an oscillatable transfer drum, of a pan slidably mounted in said drum and adapted to receive a charge of tobacco, and suction means communicating with the interior of said pan for exhausting dust and loose particles from the charge of tobacco in the pan.

14. The combination with an oscillatable transfer drum, of a pan slidably mounted in said drum and provided with a reticulated false bottom, and suction means communicating with the interior of the pan below the false bottom to suck dust and loose particles through the false bottom.

15. The combination with an oscillatable transfer drum, of a pan slidably mounted in said drum and provided with a reticulated false bottom, and suction means communicating with the interior of the pan below the false bottom to suck dust and loose particles through the false bottom, said drum having a spider on one end thereof, and said means including a tube on which said spider is loosely mounted, and an air-duct in said spider communicating with the interior of said pan and tube.

16. The combination with an oscillatable transfer drum, of a pan slidably mounted in said drum and provided with a reticulated false bottom, and suction means communicating with the interior of the pan below the false bottom to suck dust and loose particles through the false bottom, said drum having a spider on one end thereof, and said means including a tube on which said spider is loosely mounted and an air-duct in said spider communicating with the interior of the pan below the false bottom, said tube having a circumferential slot arranged to register with said air-duct.

JAMES P. DURNING.